(12) United States Patent
Baker et al.

(10) Patent No.: US 12,478,393 B2
(45) Date of Patent: Nov. 25, 2025

(54) ANTI-CLOGGING DURING CALCULI EVACUATION

(71) Applicant: GYRUS ACMI, INC., Westborough, MA (US)

(72) Inventors: Charles Baker, Rogers, MN (US); Susanna L. Mayo, Boston, MA (US); Arthur J. Bertelson, Buffalo, MN (US); Eric Stender, Champlin, MN (US)

(73) Assignee: Gyrus ACMI, Inc., Westborough, MA (US)

( * ) Notice: Subject to any disclaimer, the term of this patent is extended or adjusted under 35 U.S.C. 154(b) by 148 days.

(21) Appl. No.: 17/484,904

(22) Filed: Sep. 24, 2021

(65) Prior Publication Data

US 2022/0096108 A1 Mar. 31, 2022

Related U.S. Application Data

(60) Provisional application No. 63/083,414, filed on Sep. 25, 2020.

(51) Int. Cl.
*A61B 17/22* (2006.01)

(52) U.S. Cl.
CPC ............ *A61B 17/2202* (2013.01); *A61B 2017/22005* (2013.01); *A61B 2217/005* (2013.01)

(58) Field of Classification Search
CPC .......... A61B 17/2202; A61B 17/22012; A61B 2017/22005; A61B 2017/00017;
(Continued)

(56) References Cited

U.S. PATENT DOCUMENTS

| 4,660,573 A | 4/1987 | Brumbach |
|---|---|---|
| 9,421,023 B2 | 8/2016 | Bond et al. |

(Continued)

FOREIGN PATENT DOCUMENTS

| CN | 116261429 A | 6/2023 |
|---|---|---|
| DE | 112021005021 T5 | 7/2023 |

(Continued)

OTHER PUBLICATIONS

"International Application Serial No. PCT US2021 052042, Invitation to Pay Additional Fees mailed Dec. 3, 2021", 12 pgs.

(Continued)

*Primary Examiner* — Brooke Labranche
(74) *Attorney, Agent, or Firm* — Schwegman Lundberg & Woessner, P.A.

(57) ABSTRACT

A lithotripsy system can include a lithotripsy device and controller circuitry. The device for acoustic calculi fracture can include an acoustic treatment probe for providing acoustic energy along the probe to treat one or more calculi and an evacuation pathway extending at least partially via the prob, for removing at least a portion of the one or more calculi via the evacuation pathway. The controller circuitry, coupled to the lithotripsy device, can be configured to receive an indication of clogging of the evacuation pathway and at least one of initiate or adjust a anti-clogging mode for changing at least one characteristic of evacuation via the evacuation pathway in response to the received indication of clogging.

15 Claims, 6 Drawing Sheets

(58) Field of Classification Search
CPC .......... A61B 2017/22014; A61B 2017/22079; A61B 2217/005; A61B 2217/007; A61B 2090/064
See application file for complete search history.

(56) References Cited

U.S. PATENT DOCUMENTS

| | | | |
|---|---|---|---|
| 10,039,604 | B2 | 8/2018 | Chia et al. |
| 11,241,243 | B2 | 2/2022 | Pereira et al. |
| 2005/0261628 | A1* | 11/2005 | Boukhny ............ A61M 3/0258 604/118 |
| 2011/0105845 | A1 | 5/2011 | Gordon et al. |
| 2012/0065553 | A1 | 3/2012 | Lebet |
| 2018/0110534 | A1 | 4/2018 | Gavala et al. |
| 2018/0263643 | A1 | 9/2018 | Shelton et al. |
| 2019/0008545 | A1 | 1/2019 | Stulen et al. |
| 2019/0142443 | A1 | 5/2019 | Pereira et al. |
| 2019/0262022 | A1* | 8/2019 | Spangler ................ A61B 90/06 |

FOREIGN PATENT DOCUMENTS

| | | |
|---|---|---|
| EP | 0850597 | 7/1998 |
| JP | 2007530146 A | 11/2007 |
| JP | 2011520567 A | 7/2011 |
| WO | WO-2005092023 A2 | 10/2005 |
| WO | WO-2009143201 A1 | 11/2009 |
| WO | 2019130118 | 7/2019 |
| WO | 2019152727 | 8/2019 |
| WO | 2019239375 | 2/2020 |
| WO | 2022067092 | 3/2022 |

OTHER PUBLICATIONS

"International Application Serial No. PCT US2021 052042, International Search Report mailed Jan. 24, 2022", 7 pgs.

"International Application Serial No. PCT US2021 052042, Written Opinion mailed Jan. 24, 2022", 11 pgs.

"International Application Serial No. PCT/US2021/052042, International Preliminary Report on Patentability mailed Apr. 6, 2023", 13 pgs.

"Japanese Application Serial No. 2023-519111, Notification of Reasons for Refusal mailed Feb. 19, 2024", w/ English Translation, 9 pgs.

"Japanese Application Serial No. 2023-519111, Examiners Decision of Final Refusal mailed Aug. 13, 2024", w/ English translation, 9 pgs.

"Japanese Application Serial No. 2023-519111, Response filed May 20, 2024 to Notification of Reasons for Refusal mailed Feb. 19, 2024", w/ current English claims, 8 pgs.

"Japanese Application Serial No. 2023-519111, Response filed Dec. 13, 2024 to Examiners Decision of Final Refusal mailed Aug. 13, 2024", w/ english claims, 11 pgs.

* cited by examiner

ANTI-CLOGGING DURING CALCULI EVACUATION

PRIORITY CLAIM

This application claims the benefit of priority to U.S. Provisional Patent Application Ser. No. 63/083,414, filed Sep. 25, 2020, the contents of which are hereby incorporated by reference in their entirety.

TECHNICAL FIELD

The present document relates to techniques for breaking obstructions, such as physiological "calculi" using lithotripsy, and more particularly to techniques for anti-clogging during calculi evacuation.

BACKGROUND

Medical endoscopes were first developed in the early 1800s and have been used to inspect inside the body. A typical endoscope has a distal end comprising an optical or electronic imaging system and a proximal end with controls such as for manipulating the device or for viewing the image. An elongate shaft connects the proximal and distal ends. Some endoscopes allow a physician to pass a tool down one or more working channels, for example, to resect tissue or retrieve objects.

Over the past several decades, several advances have been made in the field of endoscopy, and in particular relating to the breaking up of physiologic calculi in the bile ducts, urinary tract, kidneys, and gall bladder. Physiological calculi in these regions may block ducts and cause a patient a substantial amount of pain and therefore must be broken down and/or removed. Different techniques have been developed to break up calculi, including ultrasonic or other acoustic lithotripsy, pneumatic lithotripsy, electro-hydraulic lithotripsy (EHL), and laser lithotripsy such as can include breaking up of calculi using a green light, YAG, or holmium laser.

SUMMARY OF THE DISCLOSURE

The present disclosure provides, among other things, devices and methods for preventing, inhibiting, or remediating clogging in a calculi fracture device, such as in an acoustic probe used for calculi fragmentation and treatment. The techniques herein can include detecting an indication of actual or imminent clogging or one or more conditions that can induce clogging or susceptibility of clogging in a lithotripsy system. Additionally, the techniques herein can include one or more anti-clogging modes that can be initiated or revised in response to a detection of clogging or potential clogging. The anti-clogging mode can help prevent, inhibit, or remediate clogs along the evacuation pathway that may otherwise occur without the assistance of the anti-clogging mode. This, in turn, can help provide the user with more continuous operation of the calculi fracture device, while secondary fragmentation is occurring, without the procedure being impeded by clogging along the evacuation pathway that may otherwise occur.

In calculi fracture procedures, such as using an acoustically transmissive probe for breaking down a calculi mass in the patient, the calculi fracture device can clog, such as along an evacuation pathway to which suction is applied to remove fragmentation detritus. The evacuation pathway can extend, for example, from the calculi fracture device tip near the targeted calculi mass, through the device body, and can include a suction or evacuation tube connected to the device along which suction is applied for removal of fragments. For example, where a calculi mass is fragmented, fractured, or dusted, the resulting calculi fragments can clog the device, such as at a probe tip, within the probe body, near an ultrasound transducer, in an attached suction passage, or elsewhere in or along the evacuation pathway, or at one or more combinations of such locations. Such a clog can impede or occlude the evacuation pathway, which can lessen or even stop subsequent evacuation during the procedure, making subsequent removal of such additional calculi fragments from the patient and device more difficult.

In some cases, the operator may even need to stop the procedure when there is a clog, such as to manually clear the clog from the evacuation tube of the device, which may require the help of additional personnel, such as a technician or nurse. Anti-clogging can sometimes be done manually using a cleaning tool, but sometimes one or more portions of the device must be disassembled to allow access to a clogged portion of the evacuation tube to loosen or reduce or remove the clog. In extreme instances, a backup device must be used to replace the clogged device. Preferably, an operator would be able to avoid or otherwise address clogging without having to halt the procedure for manual anti-clogging.

Discussed herein, a clog or potential for clogging can be detected, indicated to the system, and the system can initiate or adjust an anti-clogging mode to prevent, inhibit, or remediate clogging. Detection or indication of clogging or conditions likely to cause a clog can include detecting a change in pressure on the calculi mass, such as by change in impedance or voltage, or by a change in temperature at the handpiece. A detection of clogging, or a detection indicating likely clogging, can be used to initiate an anti-clogging mode to address that clog or potential clog during operation of the lithotripsy device to prevent pausing, stopping, or non-continuous operation.

Preventing, inhibiting, or remediating clogging methods can include an anti-clogging mode such as a reversal of flow in the device, change in frequency to move the location of nodes within the acoustic energy used in the device, or change in pressure in the evacuation tube with the use of a parallel-flow pressure tap. Such anti-clogging modes can be initiated in response to a detection of clogging, a detection of clog-inducing factors, or be scheduled to run at various portions of the operation.

In an example, a lithotripsy system can include a lithotripsy device and controller circuitry. The lithotripsy device can include an acoustic treatment probe, for providing acoustic energy along the probe to treat one or more calculi and an evacuation pathway, extending at least partially via the probe, for removing at least a portion of the one or more calculi via the evacuation pathway. The controller circuitry, coupled to the lithotripsy device, can be configured to receive an indication of clogging of the evacuation pathway and at least one of initiate or adjust an anti-clogging mode for changing at least one characteristic of evacuation via the evacuation pathway in response to the received indication of clogging.

In an example, a method of cleaning out a lithotripsy device can include receiving an indication of clogging of an evacuation pathway coupled to the lithotripsy device, and at least one of initiating or adjusting an anti-clogging mode for changing at least one characteristic of evacuation via the evacuation pathway in response to the received indication of clogging.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document describes examples of systems and methods for addressing the problem of clogging by calculi mass fragments caught along an evacuation pathway in a lithotripsy device. This can include receiving an indication of clogging or potential imminent clogging, and initiating or updating an anti-clogging mode. The evacuation pathway can extend, for example, between a distal tip of the lithotripsy device, through the body of the device, and through a suction or evacuation tube connected to the device.

One or more indications of clogging or potential clogging can be received by the system. Illustrative examples of an indication of clogging can include one or more of an indication based on a flow or pressure associated with the evacuation pathway, an electrical power characteristic or a temperature of a vacuum source (e.g., a suction or vacuum pump) coupled to the evacuation pathway, or an indication of whether the clogging is within the evacuation pathway or is caused at least in part by an outside occlusion of an opening of the evacuation pathway.

One or more anti-clogging modes can be initiated or adjusted such as to help achieve a desired effect along the evacuation pathway, for example, such as at one or more locations between the ultrasonic transducer and the evacuation tube. Illustrative examples of initiating or adjusting an anti-clogging mode can include one or more of adjusting an acoustic energy applied to or characteristic of the probe, adjusting a suction applied to or characteristic of the evacuation pathway, reversing or otherwise adjusting a flow within the evacuation pathway, adjusting an auxiliary pathway for use in combination with the evacuation pathway, or adjusting an irrigation characteristic.

Figure 1:
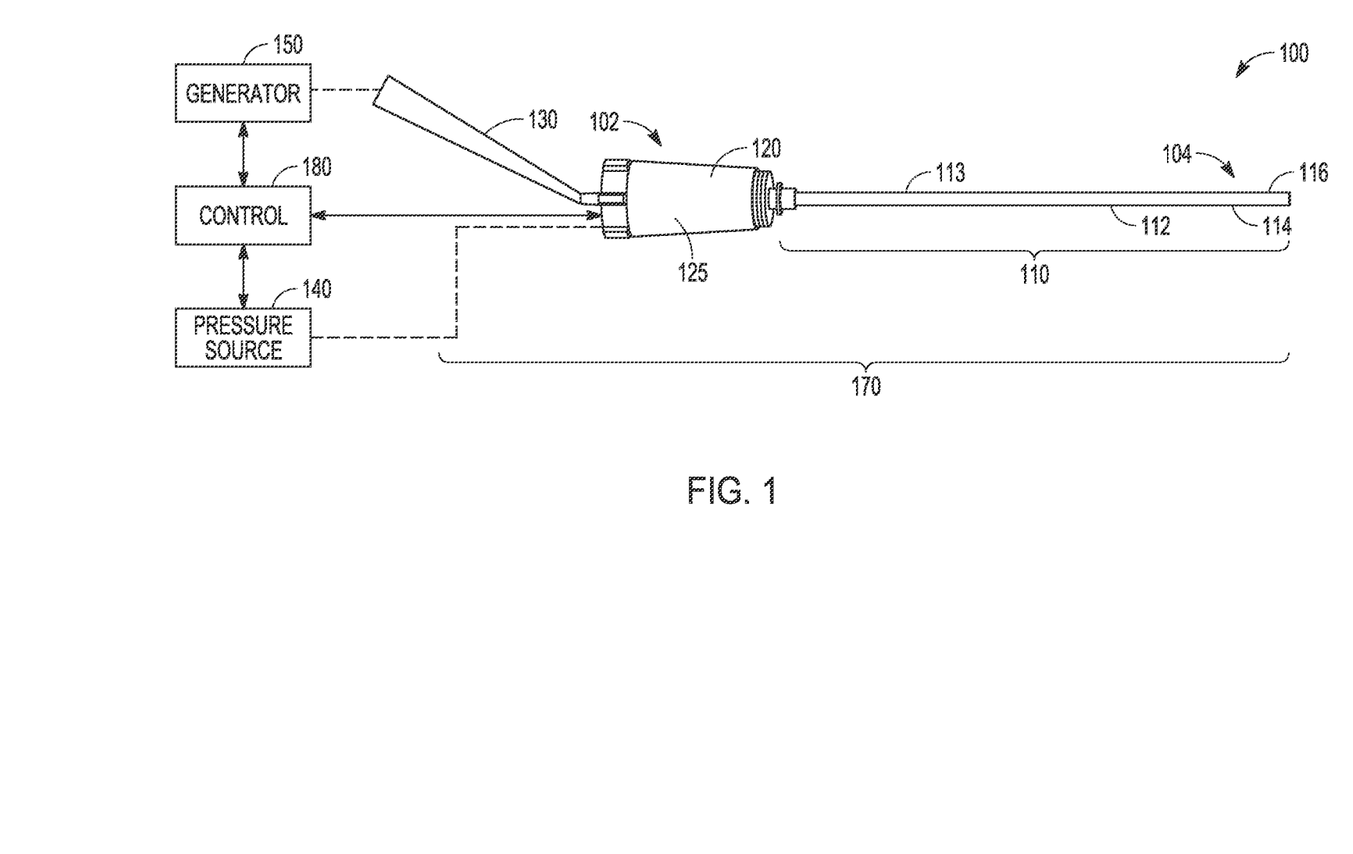
FIG. 1 illustrates a schematic diagram of an example of a calculi fracture device.

FIG. 1 illustrates a schematic diagram of an example of portions of an acoustically-transmissive calculi fracture and removal assembly 100, such as can be used with an anti-clogging mode. The assembly 100 can include a proximal portion 102 and a distal portion 104. The assembly 100 can include an acoustic probe 110 with a probe body 112. The assembly 100 can also include or be coupled to one or more of an acoustic transducer 120, a handpiece 125, an evacuation tube 130, and a pressure source 140. The assembly 100 can be in communication with a generator 150.

The assembly 100 can include a lithotripsy device for treatment of calculi such as by fragmenting. The assembly 100 can provide lithotripsy treatment such as using ultrasonic or other acoustic energy, using low frequency ballistic impact, or using any combination thereof, for fragmenting calculi or otherwise treating a physiological target. The assembly 100 can include a dual- or other multi-frequency device, such as can allow for pulsing of both sonic and ultrasonic waves for breakdown of calculi.

The probe 110 can be sized and shaped such as to allow for insertion into a patient, such as via an incision, such for treating calculi. The probe 110 can include an acoustically-transmissive probe for transfer of acoustic energy from a generator or acoustic transducer to a targeted calculi for fragmentation. The probe 110 can include a proximal portion 102, nearer the operator using the device, and a distal portion 104, nearer the site of treatment. The probe 110 can have a length of about 350 mm to about 600 mm, for example, depending on the specific probe type and distal probe tip used. The probe 110 can have a diameter of about 0.90 mm to about 3.90 mm, for example, depending on the specific probe type and probe tip used.

The probe 110 can include a probe body 112 extending between the proximal portion 102 and the distal portion 104, such as with a lumen also extending between the proximal portion 102 and the distal portion 104. The probe body 112 can be sized and shaped for insertion into a patient, such as to reach a calculi for fragmentation. The probe body 112 can include or can be made of a metallic or composite metallic material. The probe body 112 can include one or more couplers or other attachment mechanisms for coupling with the probe tip 114. The probe body 112 can allow for the operator to manipulate the placement and actuation of the probe tip 114 on or near a target calculi.

The probe tip 114 can be attached to the probe body 112. The probe tip 114 can be sized, shaped, and arranged for breaking up, fragmenting, or fracturing, one or more targeted calculi. The probe tip 114 can be attached to the probe body 112. In some cases, the probe tip 114 can include a lumen. When the probe tip 114 is attached by an end-user to the probe body 112, the lumen of the probe tip 114 can align with and extend from the lumen of the probe body 112, such as to provide a contiguous irrigation and/or an evacuation pathway 170. The probe tip 114 can have a desired morphology or other characteristic, such as a chiseled tip, a square tip, a tip with a distally facing larger or smaller surface area, a varying topography, various morphology, or be of various materials, depending on the particular procedure to be performed or the particular target upon which the procedure is to be performed.

The acoustic transducer 120 can be actuatable for providing acoustic energy to the targeted calculi via the acoustically-transmissive probe 110. The acoustic transducer 120 can provide ultrasonic energy, sonic energy, or some combination thereof, such as to break down a targeted calculi, such as by fragmenting or dusting. In some cases, the acoustic transducer 120 can be configured for shock pulsing between various energy levels or energy types. This can include, for example, applying ultrasound energy with intermittent lower-frequency acoustic energy pulses or with intermittent ballistic mechanical energy doses. The acoustic transducer 120 can provide acoustic energy of varying waveforms or frequencies, depending on the particular operation. For example, the acoustic transducer 120 can be operated to select, adjust, or optimize the waveform for one or more portions of the procedure. The acoustic transducer 120 can be acoustically coupled to the acoustically-transmissive probe body 112, such as to provide acoustic energy down the length of the probe body 112 to the probe tip 114, which can be placed near or in contact with the targeted calculi. In an example, the acoustic transducer 120 can have a diameter of about 4 to about 6 cm, a length of about 15 to about 25 cm, and a weight of about 0.4 to about 1.0 kg, depending on the specific transducer used.

The handpiece 125 can be shaped and sized to allow for the end-user operator to grip and manipulate the assembly 100. In an example, the handpiece 125 can house all or a portion of the acoustic transducer 120. The handpiece 125 can include one or more buttons or other user interface means such as to allow the operator to control the assembly 100. For example, the handpiece 125 can include a dial for variable suction control in communication with the pressure source 140. In an example, the handpiece can include one or more buttons for applying ultrasonic, sonic, or other energy from the acoustic transducer 120, to apply to the targeted calculi for fragmentation. In some examples, the system can additionally or alternatively include a foot pedal or other auxiliary actuator, such as for controlling activation of the acoustic transducer 120.

The evacuation tubing 130 can be fluidly connected to the lumen of the probe 110, such as to provide irrigation, suction, or both to the assembly 100. The evacuation tubing 130 can extend outwards from the handpiece 125 towards a pressure source 140, such as a vacuum pump. The pressure source 140 can provide an evacuation pressure down the length of the evacuation tubing 130 to draw fragments of fractured calculi stones down the evacuation tubing 130 away from the lumen of the probe 110. The evacuation tubing 130 can additionally be irrigated as desired.

The generator 150 can be in electrical communication with the assembly 100, such as to provide electrical energy to the assembly 100 during use. The generator 150 can provide electrical energy to power the acoustic transducer 120 to generate ultrasound or other acoustic or ballistic energy such as for fragmenting a targeted calculi. In an example, the generator 150 can provide AC electrical energy of about 90 to about 264 volts (peak-to-peak). The electrical energy signal provided by the generator 150 can be changed (e.g., amplitude, frequency, pulse width, modulation, etc.) such as can depend on the particular treatment to be performed, and the desired parameters.

The evacuation tubing 130 can be a portion of a larger evacuation pathway 170 extending from the probe tip 114 lumen 116 through the probe body 112 lumen 113 and through the evacuation tubing 130. Fragments of calculi can be evacuated along the evacuation pathway 170 during operation of the probe assembly 100. The probe assembly 100 can include one or more features for detection and/or treatment of a clog along the evacuation pathway 170. Examples of such features are discussed with reference to FIGS. 2A to 5B below.

The controller circuitry 180 can be coupled to and in communication with one or more of the various components of the assembly 100, such as the vacuum source 140, the acoustic transducer 120, and the electrical generator 150. The controller circuitry 180 can be configured to receive sensor data, such as pressure information, from one or more of various sensors in the assembly 100, such as to change, initiate, or adjust one or more anti-clogging modes.

Figure 2:
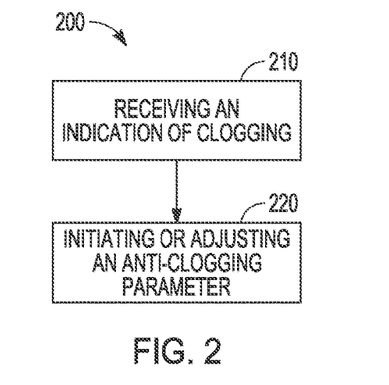
FIG. 2 illustrates a block diagram depicting an example of a method of anti-clogging a lithotripsy device.

FIG. 2 illustrates a block diagram depicting a method 200 of cleaning or de-clogging a lithotripsy device, including both receiving an indication of clogging (block 210) and initiating or adjusting an anti-clogging mode (block 220). Examples of detecting actual or imminent clogging, and examples of anti-clogging modes are listed below in Tables 1A and 1B below.

TABLE 1A

Detecting Clogging
Indications of Actual or Imminent Clogging

Detecting a change in one or more electrical properties correlating to a clog
Observing a change of force exerted by the calculi
Reduction in suction detected
Change in temperature at the hand piece detected
Detecting reduction in flow of irrigation fluid
Optical detection of clogging
Operator manual detection of clogging

TABLE 2B

Anti-Clogging Modes
Anti-Clogging Response Modes

Moving node or anti-node locations in the device by changing acoustic frequency
Pulse width modulation or change in duty cycle
Altering or reversing suction in evacuation tubing
Altering pressure applied to evacuation passage
Changing irrigation fluid flow The method can include receiving an indication of clogging (block 210), and at least one of initiating or adjusting an anti-clogging mode (block 220). Optionally, receiving an indication of clogging (210) can include detection of clogging or imminent clogging.

In step 210, clogging (or imminent clogging) can be detected in a variety of ways, such as by monitoring a change in electrical property of the current provided by the generator 150, a change in force exerted by the calculi, a change in pressure provided by the pressure source 140 or suction in the evacuation pathway 170, a change in temperature at the handpiece 125, a change in fluid flow in the evacuation tubing 130, optical detection of clogging, manual detection of clogging, combinations thereof, or other clogging detection methods.

For example, the method 200 can optionally include detecting reduction of flow in the evacuation pathway 170, such as in the evacuation tubing 130 or in the probe body 110. In some examples, detecting an indication of clogging can include detecting a change in force exerted by a calculi mass against the probe 110 during operation. Such a change in force can be detected by correlating the force to an electrical property of the current provided by the generator 150. For example, monitoring of one or more electrical properties, such as a change in impedance or voltage of the current supplied by the generator 150, can rise above a specific value, such as a threshold value, over a given period of time, that could indicate a change in that force. In some cases, detecting an indication of clogging can include detecting a change in temperature, such as a noticeable rise in temperature to the operator, at a handpiece of the lithotripsy device over a given time period. In some cases, detecting an indication of clogging can include detecting a change in fluid flow in the lithotripsy device in the irrigation and suction pathway, such as in the evacuation tubing 130. In some cases, detecting an indication of clogging can include optical detection of clogging. Examples of detecting clogging are summarized below in Table 2, and described with reference to FIG. 3 below.

TABLE 3

Example Clogging Detection and Prediction Methods

| Parameter | Change Indicating a Clog | Monitored By |
|---|---|---|
| Force Exerted by Calculi | Increased force | Change in electrical property, such as a change in impedance or voltage, provided by the electrical generator |
| Suction | Reduction in suction in the evacuation pathway | Pressure sensor in the evacuation pathway, or increase in electrical power consumed by the suction pressure source or heat generated by the suction pressure source |
| Temperature | Increase in temperature | Temperature sensor or operator sensing of temperature at handpiece |
| Irrigation Fluid Flow | Reduction in flow of irrigation fluid | Flow sensor in the evacuation pathway |
| Light | Reduction of light or change in other optical property | Optical reflectance sensor or spectrometer coupled to the device |

In addition to the methods describes in Table 1, additional or alternative methods of detecting clogging or an imminent clog can be used. Once clogging or imminent clogging is detected, an anti-clogging mode can be initiated or updated (block 220) in response to treat the clogging.

In some cases, the controller circuitry 180 can store one or more parameters values, such as threshold or desired values, such as for electrical properties. These one or more parameter values can, for example, correlate to typical "unclogged" or "clogged" situations. In this case, the generator 150 can monitor the parameters of interest and the controller circuitry 180 can compare the detected values constantly to the stored parameter values. When the detected value changes above or below an accepted stored value, an indication of clogging or potential clogging can be produced.

Initiating or adjusting an anti-clogging mode (220) can include changing at least one characteristic of evacuation along the evacuation pathway in response to the indication of clogging. Initiating or adjusting the anti-clogging mode can include disrupting clogging at a node location by moving that node, such as by altering one or more electrical or acoustic characteristics, as discussed with reference to FIG. 4 below. In some cases, initiating or adjusting the anti-clogging mode can include reversing or altering suction within the evacuation pathway for a specified amount of time, as discussed with reference to FIGS. 5A-5C below. In some cases, initiating or adjusting the anti-clogging mode can include adjusting pressure in the evacuation pathway of the lithotripsy device, such as with a pressure port tap, as described with reference to FIGS. 6A-6B below. Examples of anti-clogging modes are summarized below in Table 3, and discussed with reference to FIGS. 4-6 below.

TABLE 4

Example Anti-Clogging Response Modes

| Anti-Clogging Mode | Method Used |
|---|---|
| Moving node or anti-node locations in the device | Changing frequency of the waveform produced by the acoustic transducer; alternatively pulse width modulation or change in duty cycle |

TABLE 4-continued

Example Anti-Clogging Response Modes

| Anti-Clogging Mode | Method Used |
|---|---|
| Altering suction in evacuation tubing | Reversing or changing pressure provided by the pressure source |
| Altering pressure applied to evacuation passage | Using a pressure port tap or secondary pressure passageway to relieve pressure in the evacuation pathway |
| Changing irrigation fluid flow | Increasing or reversing fluid provided to the evacuation pathway |

One or more of these or other anti-clogging modes can be initiated, or adapted at block 220, depending on the specific indication of clogging from block 210. The anti-clogging mode can be leveraged for a specified amount of time, in a continuous, pulsatile, or scheduled manner, as desired to break up or prevent clogging within the device 100. The anti-clogging mode can be used during the course of an operation with the device 100, so as to prevent the operator from having to halt the operation, un-clog the device, and then resume. Examples of anti-clogging modes are discussed in more detail with reference to FIGS. 4-6 below.

Figure 3:
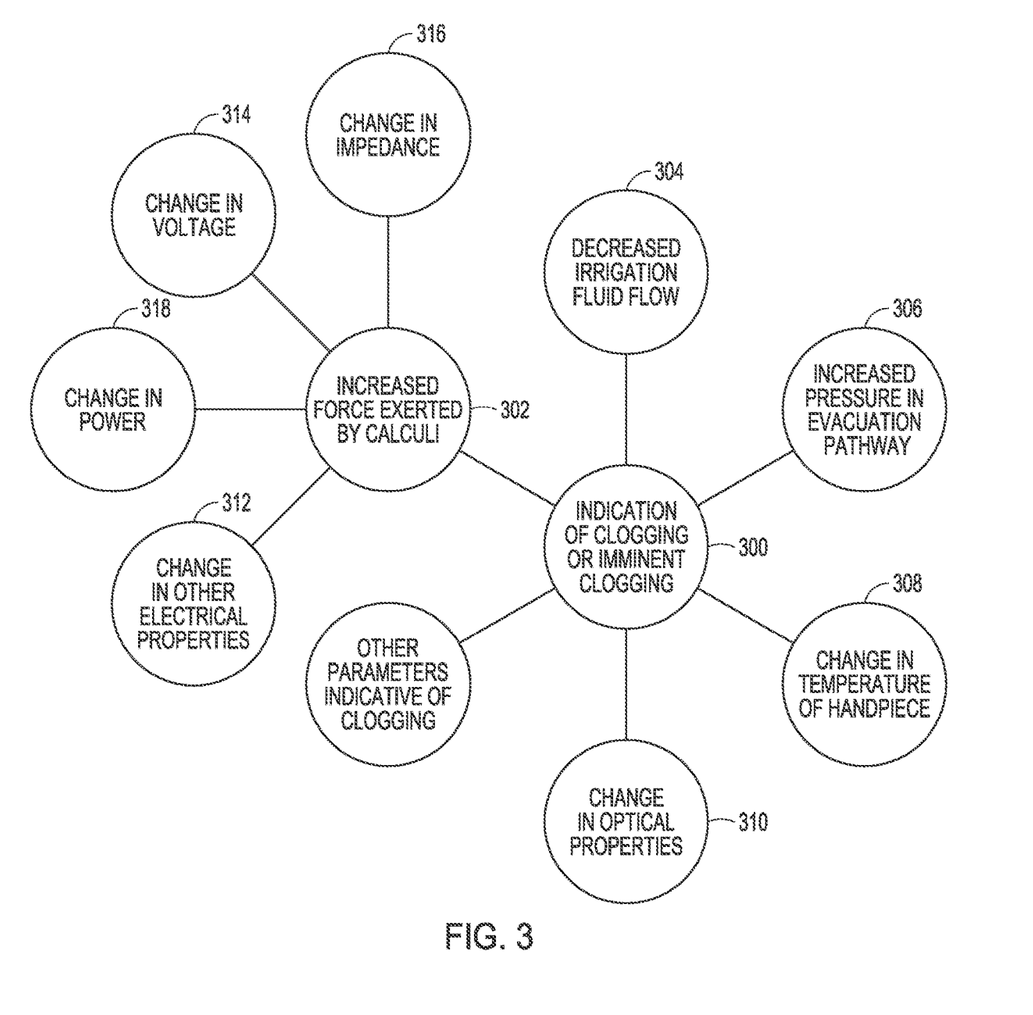
FIG. 3 illustrates a schematic diagram of examples of methods of detection of clogging in a lithotripsy device.

FIG. 3 is a schematic diagram illustrating examples 302, 304, 306, 308, and 310 of detecting actual or imminent clogging and producing and indication of clogging 300, or detecting one or more conditions that may induce clogging in a lithotripsy device. Any of the examples 302, 304, 306, 308, and 310 can be used alone or in combination, or in addition to other methods of detecting clogging, to produce an indication of clogging or imminent clogging. One or more anti-clogging modes, discussed with reference to FIGS. 4-6 below, can be initiated or altered in response to that indication of a clog or an imminent clog.

In example 302, the probe assembly 100 can be used to detect the amount of force applied by the calculi on the probe, and subsequently to determine whether the calculi is a larger or harder mass. This force can change depending on whether the probe assembly 100 is in direct contact with the calculi mass, and parameters such as calculi type, size, and hardness. With a larger or harder calculi mass the fragments may be larger and cause clogging or a restriction in flow more often. Thus, where a calculi produces a greater force, and is a larger or harder calculi, clogging may be imminent, and an indication of clogging or likelihood of can be produced.

The amount of force the calculi is exerting on the device 100 can be detected by monitoring one or more electrical properties (312) of the current producing by the generator 150. For example, a change in voltage (314) or impedance (316) of the current can indicate a change in the force exerted by the calculi on the device. The change in voltage or impedance can be detected in the probe assembly 100 through one or more sensor electrodes integrated into the assembly, such as into the acoustic transducer 120, at the generator 150, or elsewhere along the assembly 100. The one or more sensor electrodes can be in communication with the controller circuitry 180. The detected changes in voltage or impedance can be correlated to the force applied by the calculi mass. In another example, the power (318) used with the acoustic transducer 120 can be correlated to the amount of force exerted by the calculi mass for fracture.

Based on the electrical property, such as voltage, impedance, or power, detected during fragmentation of the stone, and changes in the voltage or impedance during the procedure, the amount of force applied by the targeted calculi for the fragmenting procedure can be determined, and can provide information regarding the calculi itself. The amount of force for fragmenting of the targeted calculi can be monitored throughout the procedure and help produce indications of clogging or imminent clogging. For example, when the detected force of the calculi changes, such as when the force rises significantly over a given period of time, an indication of a harder or larger calculi mass can be produced. A harder or larger calculi mass may indicate that clogging or reduction of flow is imminent, or has a higher probability of occurring during the operation. In response, the system can trigger or adjust an anti-clogging mode. Examples of such anti-clogging modes are discussed below with reference to FIGS. 3A to 5B.

In example 304, a decrease in irrigation fluid flow can be indicative of clogging. Fragmented calculi are sucked out of the patient and the device 100 during operation through the evacuation pathway 170 for disposal. The fragments can be evacuated with a combination of suction and irrigation. The flow rate of the irrigation fluid can be monitored, such as with one or more flow sensors in line with the evacuation pathway 170, or manually by the operator of the device 100. Clogging caused by full or partial blockage in the evacuation pathway 170 can cause the irrigation fluid flow to slow or halt. If a reduction of fluid flow over a specified amount, such as a threshold value, is observed, an indication of clogging or potential clogging can be produced.

In example 306, an increase in pressure in the evacuation pathway 170 can be indicative of clogging. The pressure source 140 can provide a vacuum to the device 100, such as along the evacuation pathway 170. The pressure source 140 can provide a variable pressure to the device 100 as needed for evacuation of fragments. The pressure source 140 can work in conjunction with the controller circuitry 180 to increase or decrease the vacuum when desired. The pressure in the evacuation pathway 170 can be monitored by one or more pressure sensors. If the pressure increases in the evacuation pathway, and the pressure source 140 has to increase vacuum to maintain fluid flow, this can be indicative of clogging. Thus, when an increased pressure is detected, an indication of clogging can be produced.

In example 308, a change in temperature at the handpiece can be indicative of clogging. When clogging occurs, the handpiece 125 of the device can heat up. If an operator notices an increase of temperature, the operator can indicate clogging or potential clogging. Alternatively, one or more temperature sensors could be embedded within the device 100, and be in communication with the controller circuitry 180, so as to allow an indication of clogging when the temperature increases for a set period of time above a threshold value.

In example 310, a change in one or more optical properties in the device can be indicative of clogging, such as described in U.S. Appln. No. 63/071,208 which is herein incorporated by reference in its entirety. Any of the example methods 302 to 310 can be used alone or in combination with others. Additional methods for detection of clogging can also be used.

Depending on the parameter being monitored (e.g., electrical, optical, pressure, or other), an indication of clogging or potential clogging can be produced based on the parameter rising above a specified value, such as a threshold value, or the indication can be produced based on a change in that parameter, such as over a specific time duration. In some cases, the indication of clogging can be correlated to a location within the device, such as along the evacuation pathway 170, or outside occlusion of an opening to the evacuation pathway 170, depending on what kind of sensing is performed.

For example, in a method of detecting clogging or predicting clogging, the method can start with measuring a parameter indicative of clogging, either through continuous or periodic measurement. Next, the detected parameter can be compared to a stored value parameter, such as a value of the parameter in a clogged or unclogged condition. Then, the determination of a clog or imminent clog can be made based on the comparison. If clogging is or might shortly occur, a de-clogging step can be activated. If no clogging or potential clogging is detected, monitoring can continue.

When clogging or potential clogging is detected, a signal can be provided to the assembly 100 indicating clogging. In response, the system can initiate, adapt, or adjust one or more anti-clogging modes. An anti-clogging mode can include one or more of adjusting an acoustic energy applied to or characteristic of the probe, adjusting suction applied to or characteristic of the evacuation pathway, reversing or otherwise adjusting flow within, the evacuation pathway, adjusting an auxiliary pathway for use in combination with the evacuation pathway, adjusting an irrigation characteristic, or others, as summarized in Table 3 above. Illustrative examples of anti-clogging modes are discussed in more detail below with reference to FIGS. 4A-6.

Figure 4A:
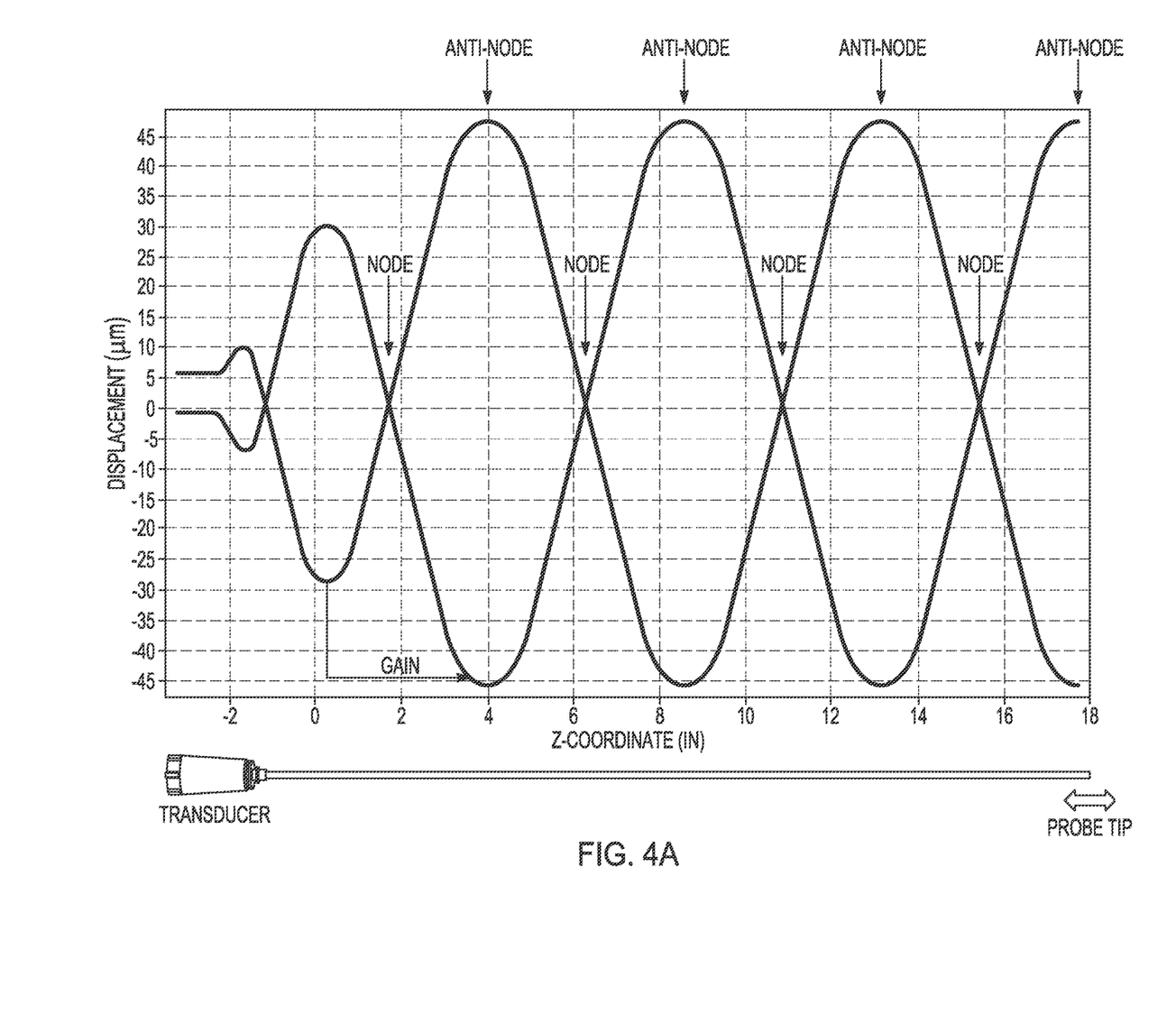
FIG. 4A-4C illustrate schematic diagrams depicting an example of an anti-clogging mode by altering the location of a node.
Figure 4B:
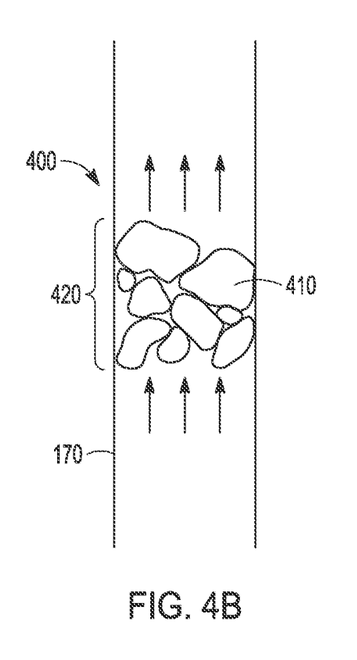
Figure 4C:
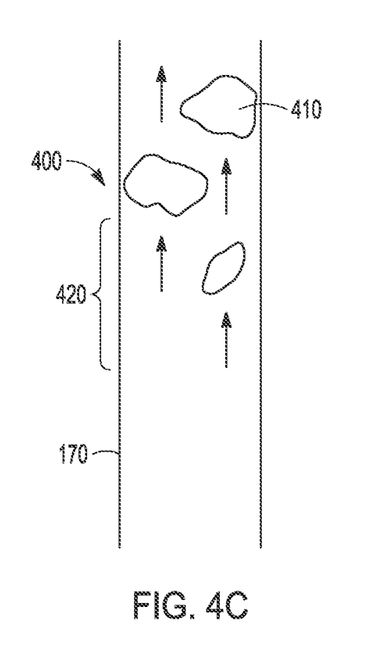

FIG. 4A-4C depicts illustrations of an anti-clogging mode being used. FIG. 4A depicts example locations of nodes and anti-nodes. Nodes can be prone to clogging, as shown in FIG. 4B. An anti-clogging mode 400 can be implemented, as shown in FIG. 4C, to break-up clogging at such a node.

FIG. 4A depicts a graphical illustration of a waveform propagated along the probe body 110. Shown in FIG. 4A, a waveform can propagate along the probe body 110 between the ultrasonic transducer 120 towards the probe tip 114, such as to allow fragmentation of a targeted calculi mass. Along the length of the probe body 110, both nodes and anti-nodes can be spaced amongst the waveform, corresponding to various points along the probe. Even when the amplitude of the waveform is altered, the nodes and anti-nodes can remain in these locations. Nodes, because of their nature within the waveform, can be prone to clogging, as less disruption of calculi occurs at nodes. In some cases, calculi can build up at nodes and cause a reduction of flow or clogging.

The anti-clogging mode 400, depicted in FIGS. 4B and 4C, can include adjusting a location of an acoustic wave anti-node ("peak") or node along the evacuation pathway to dislodge calculi pieces. In the assembly 100, the acoustic transducer 120 can provide acoustic energy as a standing wave along the length of the probe 100. The waveform can propagate along the length of the probe 100 with relatively set locations of nodes and anti-nodes based, in part, on the frequency of the acoustic energy provided. For example, a node can occur at about 21 kHz near the distal portion 104 of the assembly 100. If the frequency is altered, such as between 19.5 and 21.5 KHz, the locations of the nodes and peaks shift. This can affect fluid flow in the evacuation pathway 170, and affect the acoustic energy reaching fragments of calculi that may build up at nodes.

In assembly 100, the anti-clogging mode 400 can be implemented by the controller circuitry 180, such as for a specified amount of time, in response to an indication of clogging, on a schedule, or can be manually actuated. In some cases, the change in location of a node can be accomplished through changes in frequency, amplitude, duty cycle, or other variables. In some cases, the anti-clogging mode 400 can include pulse width modulation of the acoustic energy, such as by pulsing and varying the duty cycle of the energy provided to through the acoustic transducer 120. Movement of an anti-node or node, or other variations of the anti-clogging mode 400 can be initiated or adjusted by the controller circuitry 180, such as in response to an indication of clogging, and indication of potential clogging, on a schedule, or manually.

FIGS. 4B and 4C illustrate schematic diagrams depicting an anti-clogging mode 400 by altering the location of a node. In a lithotripsy device, such as assembly 100, any of the probe 110, the ultrasonic transducer 120, or the evacuation tube 130, can be susceptible to clogging, which can stop suction in the assembly 100. In anti-clogging mode 400, acoustic energy used during operation of the assembly 100 can be altered to prevent, address, or otherwise obviate clogging in the assembly 100. Shown in FIG. 4A, calculi fragments 410 can gather and restrict flow or clog flow at a node 420.

In the probe assembly 100, the acoustic transducer 120 can deliver steady or pulsatile acoustic energy vibrations to fragment the calculi mass. The acoustic transducer 120 can provide acoustic energy that is ultrasonic or sub-ultrasonic that propagates down the probe 110. The acoustic energy provided by the probe assembly 100 can be adjusted, such as based on one or more of a change in frequency, impedance, or power input, by the acoustic transducer 120. For example, the electrical power used to energize the acoustic transducer 120 can be adjusted between levels, such as high and low power, such as in response to a detected instance of actual or imminent clogging, such as by actuating one or more buttons or triggers on the handpiece 125, or automatically by control circuitry 180 included in or coupled to the generator 150. Similarly, the acoustic energy frequency produced by the acoustic transducer 120, such as ultrasonic or sub-ultrasonic, can be automatically established or adjusted based on one or more parameters, such as calculi size, weight, or fragment size. This tailoring of the acoustic power or frequency applied to the specific targeted calculi can allow for quicker treatment times and more efficient fragmentation of masses. This ability to adapt the power, frequency, impedance, force applied to the stone, or other parameters, or combinations thereof, can be used to address a clog along the evacuation pathway 170 and initiate or adjust an anti-clogging mode.

In some cases, clogging can occur, or be prone to occur at one or more acoustic nodes, such as node 420, along the assembly 100, such as node points in a standing wave of acoustic energy applied during operation of the assembly 100. When the assembly 100 is in operation, the anti-clogging mode 400 can be activated or edited to temporarily move or disrupt those acoustic nodes. For example, the generator 150 can be actuated by the control circuitry 180 to provide energy of a varying frequency, pulse width modulation, altering duty cycle, or change in amplitude to the assembly 100. This "clean out" mode can be run specifically to disrupt the typical standing wave that occurs at a fixed frequency vibration, such as to disrupt the node location and break free calculi mass clogging or occlusion on a temporary basis while the operation is occurring.

The anti-clogging mode 400 can be run on a schedule, or in response to an indication of potential clogging. For example, in the anti-clogging mode 400, a "clean out" or "anti-clogging" mode can be activated in the assembly 100 in response to an indication of potential clogging such as described with reference to FIG. 3 above. Alternatively, or additionally, the anti-clogging mode 400 can be on a timed schedule correlated with the operation being performed. In this case, the anti-clogging mode 400 "clean out" mode, such as varying frequency, pulse width modulation, change in duty cycle, or change in amplitude, can be initiated at specific time points throughout the operation, such as in a pulsatile manner. In some cases, the "clean out" mode can be run for longer periods of time, or continuously, as desired. Optionally, the operator can manually initiate the "clean out" mode if the operator notices a loss in flow during operation.

Figure 5A:
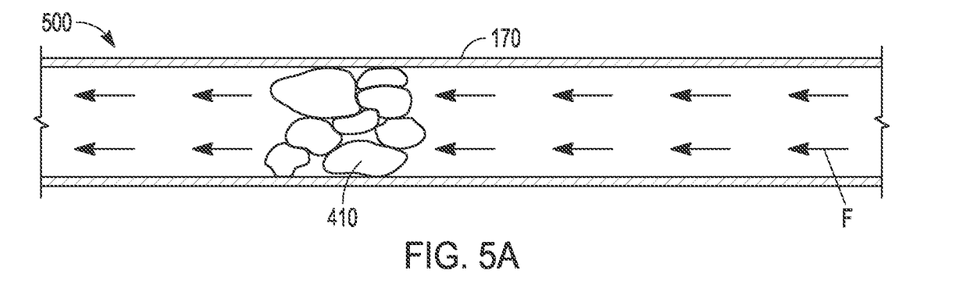
FIGS. 5A-5C illustrate schematic diagrams of an example of a method of anti-clogging using a reversal of suction in a lithotripsy device.
Figure 5B:
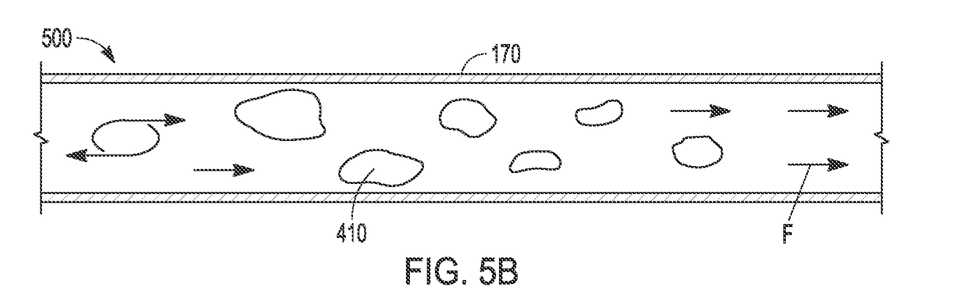
Figure 5C:
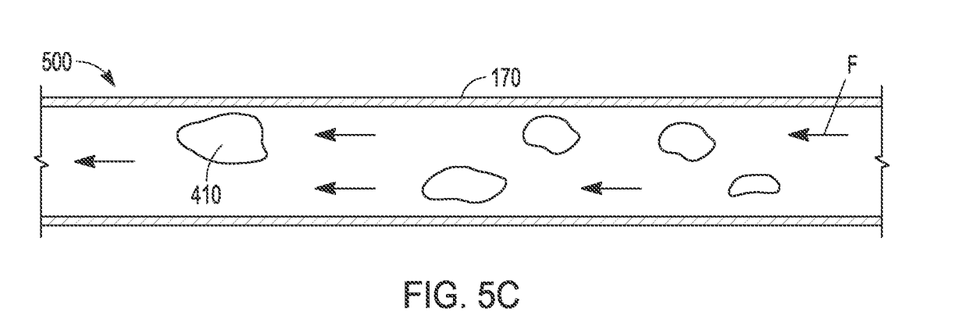

FIGS. 5A-5C illustrate schematic diagrams of a method of anti-clogging mode 500 using a reversal of suction in a lithotripsy device. The anti-clogging mode 500 can include changing or reversing suction applied to the evacuation pathway 170 for a set amount of time to dislodge one or more calculi fragments 410 by changing fluid flow (F) within the evacuation pathway 170. The amount of suction in the evacuation pathway, and the corresponding fluid flow (F) rate, can be altered within the assembly 100 at the pressure source 140, where the strength of vacuum can be altered or at the acoustic transducer 120.

FIG. 5A depicts a clog forming in the evacuation pathway 170 under normal flow conditions. During lithotripsy procedures, calculi fragment 410 removal after fracturing is desired. To remove calculi fragments 410, fluid flow (F) can be kept continuous from the kidney along the evacuation pathway 170, including through the assembly 100 probe 100 and the evacuation tubing 130. The fluid flow rate through the evacuation pathway 170 can be sufficient to remove the calculi fragments 410. If the flow rate is too low, the calculi fragments 410 are not effectively removed, either because the moving fluid stream cannot support the weight of the fragments, or because the fragments 410 stall and collect along the inner diameter of the evacuation pathway 170. In the second case, flow constrictions or blockages can occur, such as shown in FIG. 5A. Maintaining the appropriate fluid flow rate without constriction, blockage, or other clogging, can be challenging due to the multiple points at which pressure can be altered within the assembly 100. The pressure source 140, the suction flow setting on the acoustic transducer, and kinked or clamped calculi evacuation tubing can contribute to clogging.

FIG. 5B depicts a temporary reversal of flow with the anti-clogging mode 500. In FIG. 5B, the suction along the evacuation pathway 170, such as in the evacuation tubing 130, is reversed to break-up and disrupt clogging by the fragments 410. The fluid flow can be altered, for example, by changing the pressure provided at the pressure source 140 or by alerting suction flow settings on the acoustic transducer 120. Although a reversal of flow is depicted in FIG. 5B, other disruption types, such as partial reversal of flow could be used to dislodge calculi fragments. In some cases, the change or reversal of fluid flow can be done once for a set period of time. In some cases, change or reversal of fluid flow can be done multiple times over a period of time, such as on a schedule, or in a pulsatile manner. In any case, the change or reversal in fluid flow can be temporary, and allow for reduction in pressure to create turbulence for breaking up clogging.

FIG. 5C depicts restoration of a normal flow through the evacuation pathway 170. The change or reversal of fluid flow in FIG. 5B allows for dislodging of the calculi fragments, which can then continue in the restored fluid flow towards disposal. A restoration of normal fluid flow can allow for debris and fragments to be flushed away. In some cases, such a reversal or change in fluid flow can be accomplished with a change in the supply of irrigation fluid instead of a change in the suction.

The change or reversal of fluid flow can be repeated as desired, or can be scheduled throughout an operation, depending on the amount of expected clogging or restriction of flow. In some cases, an indication of clogging or indication of potential clogging, such as the detection discussed with reference to FIG. 3 above, can trigger the anti-clogging mode 400. In some cases, an indication of clogging or indication of potential clogging can trigger a change in the anti-clogging mode 400, such as an increase in the suction, an increase in the time for which suction is reversed or changed, or an increase in the number of times suction is reversed or changed throughout the operation.

Figure 6A:
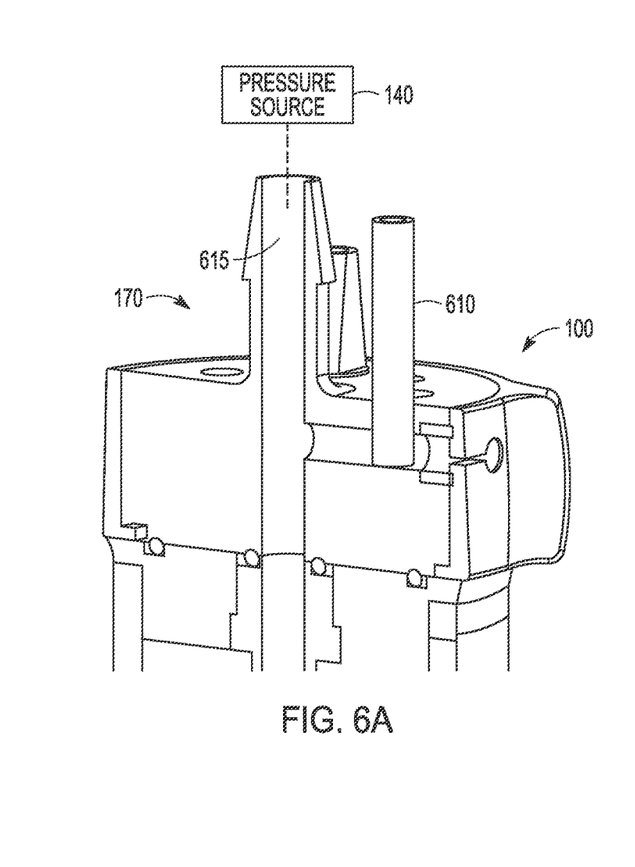
FIGS. 6A-6B illustrate schematic diagrams depicting an example of a method of anti-clogging by using a pressure port tap in parallel with the evacuation tube.
Figure 6B:
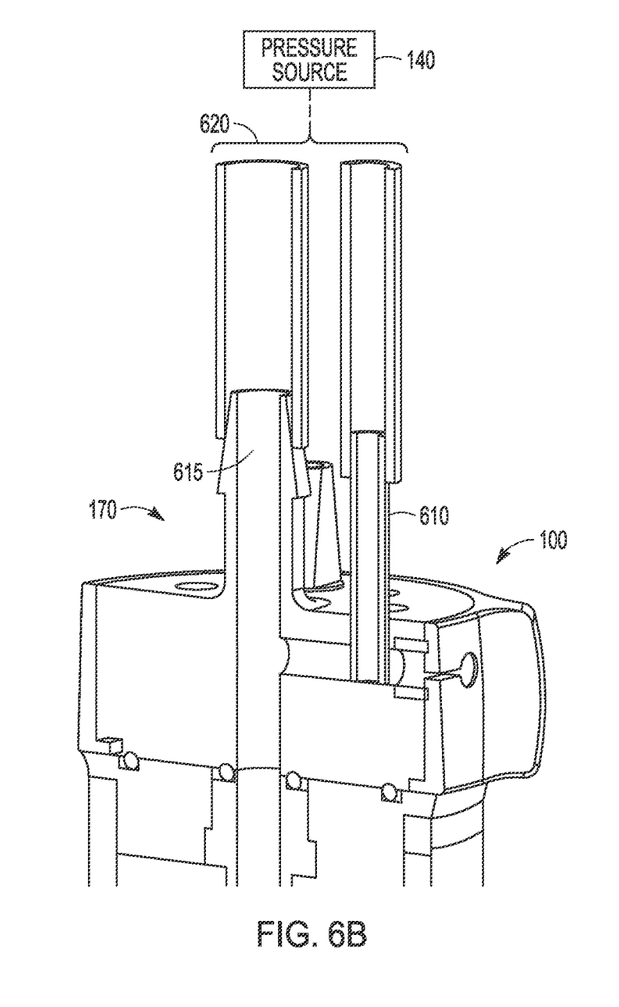

FIGS. 6A-6B illustrate schematic diagrams depicting a method of anti-clogging mode 600 by using a pressure port tap 610 in parallel with the evacuation tube. In the assembly 100, where the anti-clogging mode 600 includes the pressure port tap 610, a dual lumen tubing 620 (e.g., a catheter) can be used to connect the fluid outlet 615 of the evacuation tube 130 and the pressure port tap 610 to the pressure source 140. The pressure port tap 610 can optionally include one or more flow or suction controls. The anti-clogging mode 600 can be used, for example, in a closed loop system.

In anti-clogging mode 600, a change in pressure in the assembly 100 can leverage the pressure port tap 610 to disrupt fluid flow and dislodging or prevent clogging. Within the assembly 100, the pressure source 140 such as a vacuum pump, one or more suction control vents in the transducer, and the ambient room pressure can all affect pressure within the assembly 100 and subsequently effect clogging within the assembly 100. The pressure differences at these various points can be affected to alter the fluid flow rate within the evacuation pathway 170. Pressure or suction within the device can be monitored at these points.

The dual lumen tube 620 can provide a conduit for both the procedure effluent and the pressure level in the fluid outlet 615. The controller circuitry 180 and pressure source 140 can communicate with one or more pressure sensors in the dual lumen tube 620, such as one or more sensors located in the pressure port tap 610. The controller circuitry 180 can compare the pressure signal to the vacuum level provided by the pressure source 140 itself. Depending on the pressure information, the controller circuitry 180 can direct the pressure source 140 to adjust the vacuum in the assembly 100 and the dual lumen tube 520 as needed. For example, where pressure in the main fluid outlet 615 decreases relative the vacuum provided, potentially indicating a clog, the pressure source 140 can adjust the provided vacuum. Alternatively, an increase in the pressure difference between the main fluid outlet 615 and the vacuum source 140 can be potentially indicative of a clog. The pressure source 140 can then be adjusted to change the provided vacuum and maintain luminal patency within the device evacuation pathway 170.

Alternatively, if a closed-loop fluid control is not desired, a low flow signal can be executed, and the operator can manually make appropriate adjustments to the pressure source 140. In some cases, various smaller pressure sensors can be included in the acoustic transducer 120 to provide a pressure signal. In this case, the pressure sensors can be electrically coupled to the controller circuitry 180 through the circuitry in the acoustic transducer 120.

Various Notes & Examples

Each of these non-limiting examples can stand on its own, or can be combined in various permutations or combinations with one or more of the other examples.

Example 1 can include a lithotripsy system comprising: a lithotripsy device comprising: an acoustic treatment probe, for providing acoustic energy along the probe to treat one or more calculi; and an evacuation pathway, extending at least partially via the probe, for removing at least a portion of the one or more calculi via the evacuation pathway; and controller circuitry, coupled to the lithotripsy device, configured to: receive an indication of clogging of the evacuation pathway; and at least one of initiate or adjust an anti-clogging mode for changing at least one characteristic of evacuation via the evacuation pathway in response to the received indication of clogging.

Example 2 can include Example 1, wherein the indication of clogging is based on at least one of: a flow associated with the evacuation pathway; a pressure associated with the evacuation pathway; an electrical power characteristic of a vacuum source coupled to the evacuation pathway; or a temperature associated with the vacuum source coupled to the evacuation pathway.

Example 3 can include any of Examples 1-2, wherein the indication of clogging includes an indication of whether the clogging is within the evacuation pathway or an outside occlusion of an opening of the evacuation pathway.

Example 4 can include any of Examples 1-3, wherein at least one of initiating or adjusting an anti-clogging mode for changing at least one characteristic of evacuation via the evacuation pathway in response to the received indication of clogging, comprises at least one of: adjusting an acoustic energy applied to or characteristic of the probe; adjusting a suction applied to or characteristic of the evacuation pathway; reversing or otherwise adjusting a flow within the evacuation pathway; adjusting an auxiliary pathway for use in combination with the evacuation pathway; or adjusting an irrigation characteristic.

Example 5 can include any of Examples 1-4, wherein the indication of clogging includes a change in a monitored parameter value.

Example 6 can include any of Examples 1-5, wherein the indication of clogging includes comparing the change in the monitored parameter to a specified threshold value.

Example 7 can include any of Examples 1-6, wherein the indication of clogging includes a change in monitored parameter value and a corresponding time duration of the change in monitored parameter value.

Example 8 can include any of Examples 1-7, wherein at least one of initiating or adjusting an anti-clogging mode for changing at least one characteristic of evacuation via the evacuation pathway in response to the received indication of clogging, comprises adjusting a location of an acoustic wave anti-node or node along the evacuation pathway.

Example 9 can include any of Examples 1-8, wherein at least one of initiating or adjusting a anti-clogging mode for changing at least one characteristic of evacuation via the evacuation pathway in response to the received indication of clogging, comprises changing an acoustic frequency produced along the evacuation pathway by an acoustic transducer.

Example 10 can include any of Examples 1-9, wherein at least one of initiating or adjusting a anti-clogging mode for changing at least one characteristic of evacuation via the evacuation pathway in response to the received indication of clogging, comprises pulse width modulation of the acoustic energy.

Example 11 can include any of Examples 1-10, wherein at least one of initiating or adjusting a anti-clogging mode for changing at least one characteristic of evacuation via the evacuation pathway in response to the received indication of clogging, comprises changing suction applied to the evacuation pathway.

Example 12 can include any of Examples 1-11, wherein changing suction comprises reversing the suction for a specified amount of time.

Example 13 can include any of Examples 1-12, wherein changing suction comprises using a pressure port tap fluidly coupled to the evacuation pathway.

Example 14 can include any of Examples 1-13, wherein the pressure port tap and the evacuation pathway are connected to a pressure source through a dual lumen catheter.

Example 15 can include any of Examples 1-14, wherein the pressure port tap comprises one or more flow or suction controls.

Example 16 can include a method of cleaning out a lithotripsy device comprising: receiving an indication of clogging of an evacuation pathway coupled to the lithotripsy device; and at least one of initiating or adjusting an anti-clogging mode for changing at least one characteristic of evacuation via the evacuation pathway in response to the received indication of clogging.

Example 17 can include Example 16, further comprising detecting an indication of clogging of the evacuation pathway.

Example 18 can include any of Examples 16-17, wherein detecting an indication of clogging comprises detecting change in force applied by a calculus as a change in impedance, power, or voltage.

Example 19 can include any of Examples 16-18, wherein detecting an indication of clogging comprises detecting a change in pressure at a handpiece of the lithotripsy device.

Example 20 can include any of Examples 16-19, wherein detecting an indication of clogging comprises detecting a change in fluid flow in the lithotripsy device.

Example 21 can include any of Examples 16-20, wherein at least one of initiating or adjusting an anti-clogging mode for changing at least one characteristic of evacuation via the evacuation pathway in response to the received indication of clogging comprises disrupting clogging at node location by moving the node.

Example 22 can include any of Examples 16-21, wherein at least one of initiating or adjusting an anti-clogging mode for changing at least one characteristic of evacuation via the evacuation pathway in response to the received indication of clogging comprises reversing suction at clogging for a predetermined amount of time.

Example 23 can include any of Examples 16-22, wherein at least one of initiating or adjusting an anti-clogging mode for changing at least one characteristic of evacuation via the evacuation pathway in response to the received indication of clogging comprises adjusting pressure in the evacuation pathway of the lithotripsy device.

Example 24 can include a method for detecting clogging in a lithotripsy system, comprising: monitoring a parameter indicative of clogging; comparing the monitored parameter to a stored value of the parameter; determining, based on the comparison, whether a clog is likely to occur, or has already occurred; and initiating a de-clogging sequence if clogging is likely to occur or has already occurred.

Example 25 can include Example 24, wherein monitoring a parameter is done continuously.

Example 26 can include any of Examples 24-25, wherein monitoring a parameter is done periodically.

Example 27 can include any of Examples 24-26, wherein the parameter is an electrical, optical, or physical parameter of the lithotripsy system.

Example 28 can include any of Examples 24-27, wherein the stored value of the parameter is a value indicative of clogging.

Example 29 can include any of Examples 24-28, wherein the stored value of the parameter is a value indicative of no clogging.

Example 30 can include any of Examples 24-29, comprising further monitoring the parameter indicative of clogging if clogging is not detected.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A lithotripsy system comprising:
   a lithotripsy device comprising:
      an acoustic treatment probe, for providing acoustic energy along the acoustic treatment probe to treat one or more calculi;
      an evacuation pathway, extending at least partially via the acoustic treatment probe, for removing at least a portion of the one or more calculi via the evacuation pathway; and
      controller circuitry, coupled to the lithotripsy device, configured to:
         monitor an electrical power characteristic of a vacuum pump coupled to the evacuation pathway, the electrical power characteristic including at least one of current, voltage, or impedance;
         form a determination, based on the electrical power characteristic, that the evacuation pathway is clogged; and
         at least one of initiate or adjust an anti-clogging mode for changing at least one characteristic of evacuation via the evacuation pathway in response to the determination that the evacuation pathway is clogged.

2. The lithotripsy system of claim 1, wherein the determination includes an indication of whether the clogging is within the evacuation pathway or an outside occlusion of an opening of the evacuation pathway.

3. The lithotripsy system of claim 1, wherein the at least one of initiating or adjusting the anti-clogging mode comprises at least one of:
   adjusting an acoustic energy applied to or characteristic of the acoustic treatment probe;
   adjusting a suction applied to or characteristic of the evacuation pathway;
   reversing or otherwise adjusting a flow within the evacuation pathway;
   adjusting an auxiliary pathway for use in combination with the evacuation pathway; or
   adjusting an irrigation characteristic.

4. The lithotripsy system of claim 1, wherein the determination includes a change in a value of the electrical power characteristic.

5. The lithotripsy system of claim 4, wherein the determination includes comparing the change in the value of the electrical power characteristic to a specified threshold value.

6. The lithotripsy system of claim 4, wherein the determination includes a change in value of the electrical power characteristic and a corresponding time duration of the change in value of the electrical power characteristic.

7. The lithotripsy system of claim 1, wherein the anti-clogging mode and the acoustic energy are both provided from a generator.

8. A lithotripsy system comprising:
   a lithotripsy device comprising:
      an acoustic treatment probe, for providing acoustic energy along the acoustic treatment probe to treat one or more calculi;
      an evacuation pathway, extending at least partially via the acoustic treatment probe, for removing at least a portion of the one or more calculi via the evacuation pathway; and
      controller circuitry, coupled to the lithotripsy device, configured to:
         monitor a temperature of a vacuum pump coupled to the evacuation pathway;
         form a determination, based on the temperature, that the evacuation pathway is clogged;
         at least one of initiate or adjust an anti-clogging mode for changing at least one characteristic of evacuation via the evacuation pathway in response to the determination that the evacuation pathway is clogged.

9. A method of cleaning out a lithotripsy device that includes an evacuation pathway, the method comprising:
   monitoring at least one of an electrical power characteristic of a vacuum pump coupled to the evacuation pathway or a temperature of the vacuum pump, the electrical power characteristic including at least one of current, voltage, or impedance;
   forming a determination, based on the at least one of the electrical power characteristic or the temperature, that the evacuation pathway is clogged;
   and
   at least one of initiating or adjusting an anti-clogging mode for changing at least one characteristic of evacuation via the evacuation pathway in response to the determination that the evacuation pathway is clogged.

10. The method of claim 9, wherein forming the determination comprises: comparing a monitored value of the electrical power characteristic to a specified criterion.

11. The method of claim 9, wherein forming the determination comprises: comparing a change in a monitored value of the electrical power characteristic to a specified criterion.

12. The method of claim 9, wherein forming the determination comprises: comparing a change in a monitored value of the electrical power characteristic, within a specified time duration, to a specified criterion.

13. The method of claim 9, wherein forming the determination comprises: comparing a monitored value of the temperature to a specified criterion.

14. The method of claim 9, wherein forming the determination comprises: comparing a change in a monitored value of the temperature to a specified criterion.

15. The method of claim 9, wherein forming the determination comprises: comparing a change in a monitored value of the temperature, within a specified time duration, to a specified criterion.

* * * * *